US012168255B2

United States Patent
Ovaere et al.

(10) Patent No.: US 12,168,255 B2
(45) Date of Patent: Dec. 17, 2024

(54) OPTIMIZATION OF SUPPORTS FOR THE ADDITIVE MANUFACTURING OF A COMPONENT

(71) Applicant: SAFRAN AIRCRAFT ENGINES, Paris (FR)

(72) Inventors: Nicolas Ovaere, Moissy-Cramayel (FR); Jacques Marcel Arthur Bunel, Moissy-Cramayel (FR); Thomas Gricourt, Moissy-Cramayel (FR); Paul André Somazzi, Moissy-Cramayel (FR); Sylvain Zambelli, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 259 days.

(21) Appl. No.: 17/040,255

(22) PCT Filed: Mar. 19, 2019

(86) PCT No.: PCT/FR2019/050612
§ 371 (c)(1),
(2) Date: Sep. 22, 2020

(87) PCT Pub. No.: WO2019/180364
PCT Pub. Date: Sep. 26, 2019

(65) Prior Publication Data
US 2021/0008624 A1 Jan. 14, 2021

(30) Foreign Application Priority Data
Mar. 23, 2018 (FR) ...................................... 1852559

(51) Int. Cl.
*B22F 10/00* (2021.01)
*B22F 5/00* (2006.01)
(Continued)

(52) U.S. Cl.
CPC .............. *B22F 10/00* (2021.01); *B22F 5/009* (2013.01); *B22F 10/47* (2021.01); *B29C 64/40* (2017.08);
(Continued)

(58) Field of Classification Search
CPC ...... B29C 64/40; B22F 2003/247; B22F 3/24; B22F 5/009; B22F 10/28; B22F 10/47;
(Continued)

(56) References Cited

U.S. PATENT DOCUMENTS

2014/0303942 A1* 10/2014 Wighton ............... B29C 64/165
703/1
2017/0066083 A1 3/2017 Shioya et al.
2019/0079491 A1* 3/2019 Barua .................... B29C 64/40

FOREIGN PATENT DOCUMENTS

DE 102013218760 A1 3/2015
EP 2719870 B1 12/2016
(Continued)

OTHER PUBLICATIONS

Search Report issued in French Patent Application No. 1852559 dated Nov. 7, 2018.
(Continued)

*Primary Examiner* — Moshe Wilensky
(74) *Attorney, Agent, or Firm* — Pearne & Gordon LLP

(57) ABSTRACT

A method for producing, by additive manufacturing, a part including at least one surface that must be held during the manufacturing, the method including: a step of forming a raw part by additive manufacturing, the raw part including a support including a pillar and a head which is an alveolar element connecting the pillar to the surface to be held; and a step of detaching the support from the rest of the raw part.

9 Claims, 5 Drawing Sheets

(51) Int. Cl.
    *B22F 10/47* (2021.01)
    *B29C 64/40* (2017.01)
    *B33Y 10/00* (2015.01)
    *B33Y 80/00* (2015.01)
    *F01D 25/16* (2006.01)
    *B22F 10/28* (2021.01)
    *B22F 10/66* (2021.01)

(52) U.S. Cl.
    CPC ............... *B33Y 10/00* (2014.12); *B33Y 80/00* (2014.12); *F01D 25/162* (2013.01); *B22F 10/28* (2021.01); *B22F 10/66* (2021.01); *F05D 2240/50* (2013.01)

(58) Field of Classification Search
    CPC .......... B22F 10/66; B22F 10/00; B33Y 40/00; B33Y 10/00; F05D 2240/50; F01D 25/162
    See application file for complete search history.

(56) References Cited

FOREIGN PATENT DOCUMENTS

| | | |
|---|---|---|
| FR | 3013380 A1 | 5/2015 |
| WO | 2014124969 A1 | 8/2014 |

OTHER PUBLICATIONS

International Search Report for issued in Application No. PCT/FR2019/050612 dated May 17, 2019.
Written Opinion for PCT/FR2019/050612 dated May 17, 2019.

\* cited by examiner

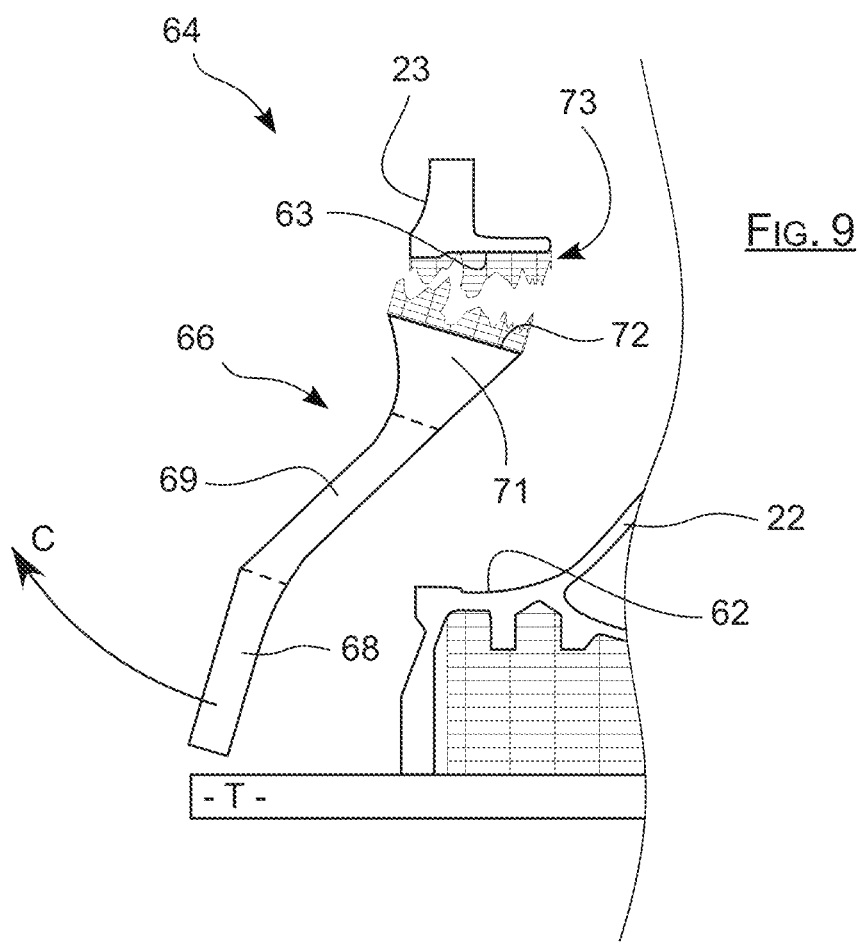

OPTIMIZATION OF SUPPORTS FOR THE ADDITIVE MANUFACTURING OF A COMPONENT

This is the National Stage of PCT international application PCT/FR2019/050612, filed on Mar. 19, 2019 entitled "OPTIMISATION OF SUPPORTS FOR THE ADDITIVE MANUFACTURING OF A PART", which claims the priority of French Patent Application No. 1852559 filed Mar. 23, 2018, both of which are incorporated herein by reference in their entirety.

TECHNICAL FIELD

The present invention relates to the forming of a bearing support of an aircraft engine by additive manufacturing.

GENERAL CONTEXT OF THE INVENTION

A bypass turbine engine includes an inlet sleeve receiving the air upstream that is aspirated by a low-pressure compressor, before being divided into a central primary flow and a secondary flow surrounding the primary flow. After having passed the low-pressure compressor, the secondary flow is propelled downstream to generate a thrust by being blown around the primary flow, upstream and downstream being defined with respect to the direction of flow of fluid in the turbine engine.

After having passed the low-pressure compressor, the primary flow passes through a high-pressure compressor before reaching a combustion chamber. This primary flow is then expanded in a high-pressure turbine engine linked in rotation with the high-pressure compressor, then in a low-pressure turbine linked in rotation to the low-pressure compressor, before being expulsed downstream.

In the case of a two-spool turbine engine, the high-pressure compressor and the high-pressure turbine are part of a high-pressure body that surrounds a low-pressure trunnion by rotating at a speed different from the latter, this low-pressure trunnion carrying the low-pressure compressor and the low-pressure turbine.

The low-pressure trunnion and the high-pressure body are carried upstream and downstream by bearings housed in enclosures that isolate them from the rest of the engine. Each bearing is lubricated by oil circulating in the enclosure that surrounds it, and which is delimited by fixed elements and by the rotating element that passes through it. Such a bearing is carried by a support while being surrounded by the enclosure.

FIG. 1, of a section of a downstream portion of a turbine engine 1 according to a design possibility that the invention proposes to improve, shows a low-pressure trunnion 2, at the downstream end of which is made integral a ferrule 3 that extends radially to be made integral with discs 4 of a low-pressure turbine 5 extending around a downstream portion of the trunnion 2.

The trunnion 2 is surrounded in its downstream region by a bearing support 6 that carries a sleeve 7 intended to receive a roller bearing 8 to support the downstream portion of the trunnion 2, and which is integral with a fixed element 9 of the engine located upstream thereof, by a cone 10. This cone 10 widens from its downstream portion where it is integral with the support 6, to its upstream portion where it is integral with the fixed element 9.

The cone 10 is surrounded by a cylindrical element 11 integral with the upstream portion thereof that it extends downstream, to delimit with this cone 10 and with the ferrule 3 a portion of an enclosure 12 that encloses the bearing.

As can be seen in FIG. 2 of a design possibility that the invention proposes to improve, a skirt 13 and two revolution members 14 and 15 extend the central region of the cone 10 respectively upstream and downstream, this skirt and these members having outer diameters of about the inner diameter of the cone 10. An upstream support 16 including a ring through which it is fastened upstream of the skirt 13 carries a segmented radial seal 17 that delimits an enclosure 18 upstream from the bearing 8. The revolution element 14 delimits jointly with the trunnion 2 two concentric enclosures 19 and 20 located downstream from the bearing 8.

In light of the manufacturing and mounting constraints with conventional techniques, these components, namely the support 6, the cone 10, the cylindrical element 11 the skirt 13, the element 14 and the upstream support 16 are fastened to one another according to different methods including in particular TIG welding.

Generally, the design and the manufacture of a bearing support are complex and expensive operations that entail a multitude of processes.

The purpose of the invention is to provide a solution to overcome this disadvantage.

DISCLOSURE OF THE INVENTION

For this purpose, the invention has for object a method for obtaining, by additive manufacturing, a component including at least one surface that has to be supported during manufacture, including:
  a step of forming by additive manufacturing a one-piece blank component on a build plate comprising a support including:
    a pillar comprising a foot from which the manufacture of this pillar starts, this pillar being a block of material, and
    a cap which is a cellular element connecting the pillar to the surface to be supported;
  a step of detaching the support from the rest of the blank component consisting in pulling on the foot (68) in the manner of a lever by following an arc path (C).

With this solution, the pillar forms an offset edification surface of the cellular cap, preventing the latter from being erected from a zone that is difficult for detaching, while still reducing the volume thereof.

The invention also relates to a method thus defined, wherein the step of detaching of the support includes:
  the removal of the pillar inducing a rupture at the cap, and
  a finishing step to suppress residues from the cap remained attached to the surface to be supported.

The invention also relates to a method thus defined, wherein the pillar includes an inclined segment that extends the foot, and a head that terminates the inclined segment (69) and whereon the cap (67) is manufactured.

The invention also relates to a method thus defined, wherein the foot is directly erected from the build plate from which the component starts the manufacture thereof.

With this arrangement, the pillar is attached to the rest of the blank component by the cap only, thus limiting the quantity of surface to be reworked during the finishing step, in particular when a portion of cap is taken away by the pillar during the removal thereof which is carried out in a simple manner.

The invention also relates to a method thus defined, wherein the component is a bearing support comprising at least one surface requiring being supported during the additive manufacturing thereof.

The invention also relates to an aircraft engine comprising a bearing support manufactured with the method thus defined.

BRIEF DESCRIPTION OF THE DRAWINGS

FIG. 9 is a cross-section view of a blank component comprising a support to support a window and locally a stiffener in the extension of this window during a detaching step according to the invention;

DETAILED DISCLOSURE OF PARTICULAR EMBODIMENTS

Bearing Support

According to the invention, the bearing support is a metal component formed from a single piece by additive manufacturing, including in particular a fastening cone and a cylindrical element surrounding this cone, instead of manufacturing them separately to then assemble them.

Figure 1:
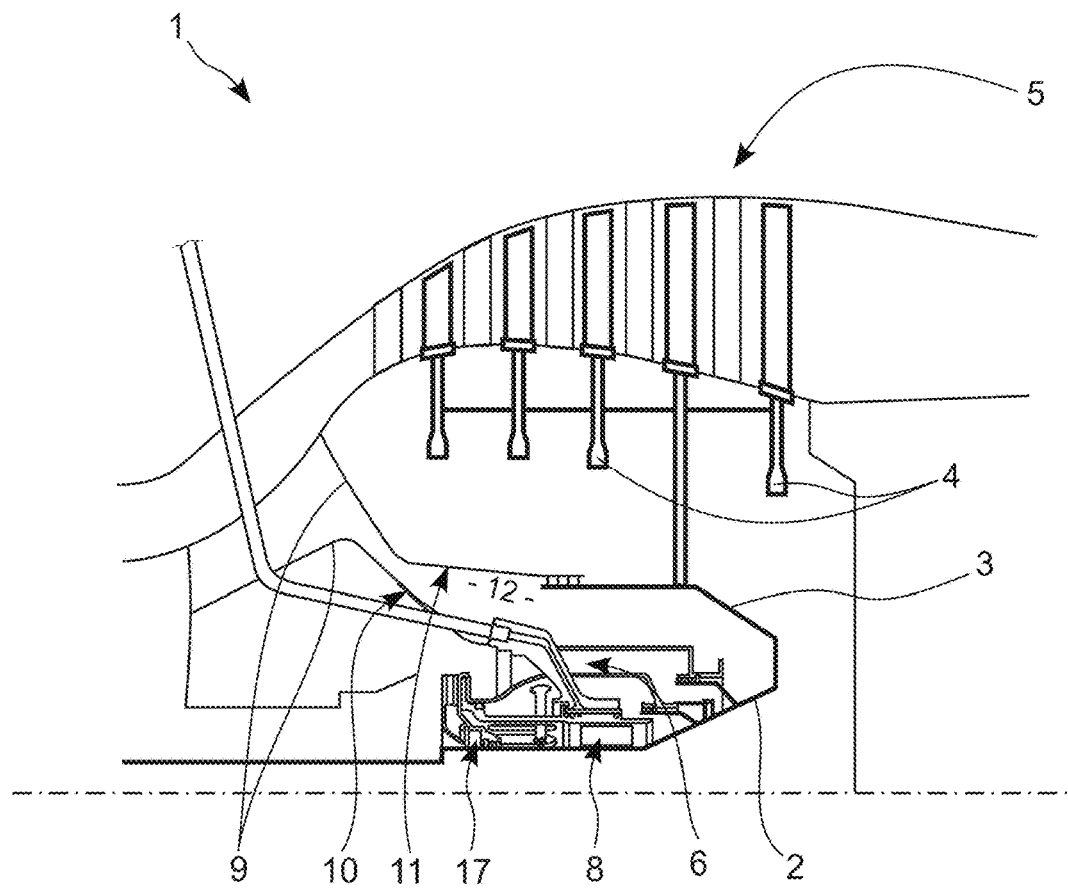
FIG. 1 already described is a diagrammatical cross-section view of a section of a downstream portion of a turbine engine.
Figure 2:
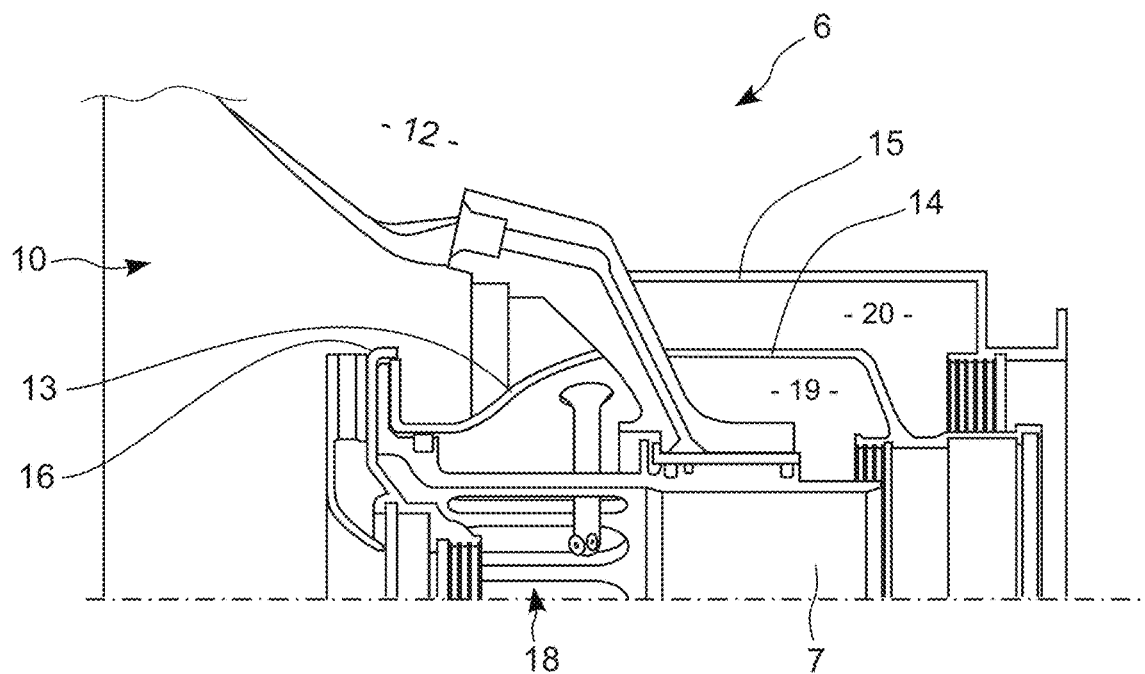
FIG. 2 already described is a cross-section view of a portion of an upper section of the downstream portion of a turbine engine.
Figure 3:
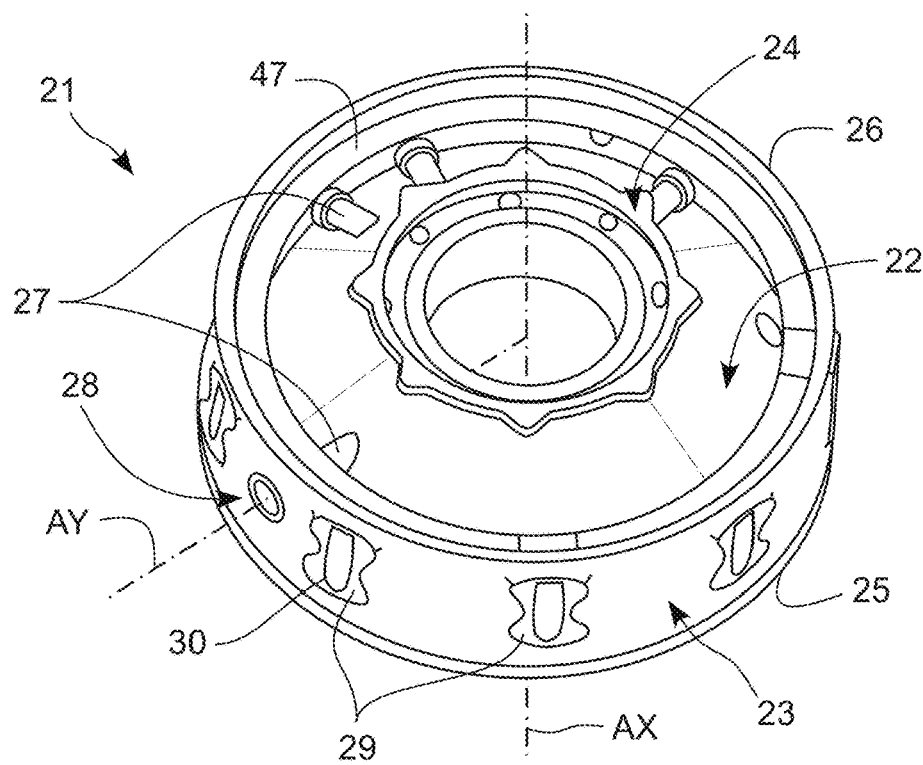
FIG. 3 is a perspective view of a bearing support manufactured according to the invention.

This bearing support that appears in FIG. 3 where it is marked by 21 includes a cone frustum or cone 22, that has its large-diameter periphery extended by a generally cylindrical element 23, and having its small-diameter periphery extended by a ring 24. The bearing support 21 has a general shape of revolution about an axis AX coincident with the longitudinal axis of the engine wherein it is intended to be mounted, the cone 22 and the cylindrical element 23 having this axis AX as axis of revolution.

The cylindrical element 23 extends from a first edge 25 to a circular second edge 26 that substantially has the same diameters while still being spaced from one another along the axis AX. The first edge 25 is the closest to the large-diameter periphery of the cone 22, this cone having a diameter that shrinks when approaching the second edge 26.

The bearing support 21 further includes four ducts 27, wherein oil and/or air circulate, which pass through the cone 22 radially with respect to the axis AX by extending to the vicinity of the cylindrical element 23. An orifice 28 is formed in the cylindrical element opposite each duct 27.

This bearing support also includes bosses 29 that radially extend beyond the cylindrical element 23 outwards by being regular spaced along the circumference thereof. Each boss 29 includes a central window 30 i.e. an opening that places in communication the inside and the outside of the cylindrical element 23.

Figure 4:
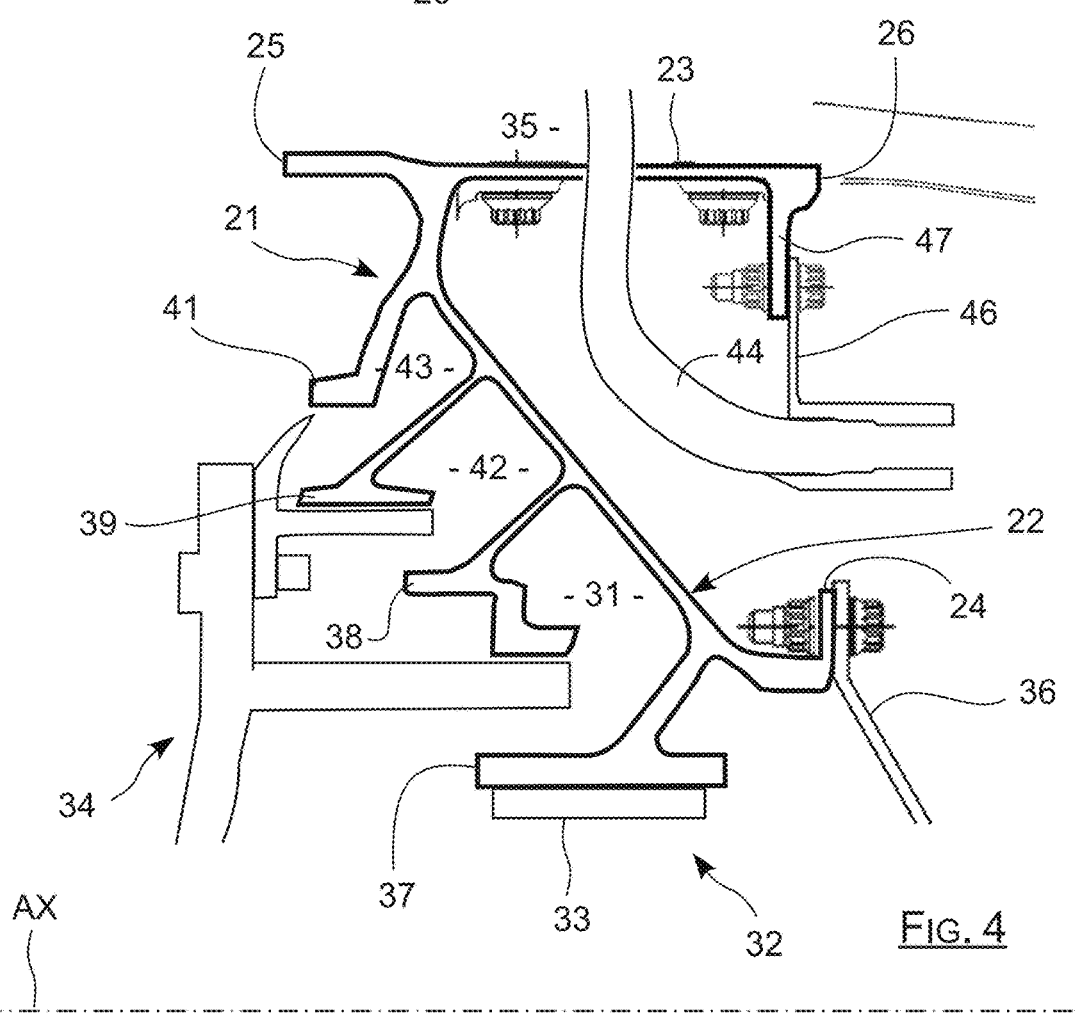
FIG. 4 is a cross-section view of a portion of an aircraft engine provided with a bearing support manufactured according to the invention.

FIG. 4 shows a portion of an aircraft engine provided with a bearing support of the type of support 21 delimiting a main enclosure 31 that surrounds a bearing 32 that encloses an outer bearing ring 33. This main enclosure 31 is delimited by a trunnion portion 34 of axis AX, by the bearing support 21 of which the cylindrical element 23 is fastened to a fixed element 35 of the engine, and by a ferrule 36, fastened to the ring 24 that extends the bearing support 21 to the axis AX.

A series of rings 37, 38, 39, 41 extends beyond the cone 22 to the axis AX. The first ring 37 protrudes in the main enclosure 31 to carry the ring 33. Each other ring 38, 39 and 41 is contiguous with a corresponding portion of the trunnion 34, to delimit with it two annex annular enclosures 42 and 43.

When the bearing support 21 is integrated into the engine, it is provided with at least one pipe 44 that radially passes through a window 30, and folds back parallel to the axis AX. This pipe 44 is carried by a retaining member 46 fastened to a stiffener 47. This stiffener 47 has a shape of an inner ring, i.e. protruding radially towards the axis AX over the entire periphery of the cylindrical element, by being located in the vicinity of the second edge 26. Such a bearing support typically includes two pipes of the type of pipe 44, spaced one from the other by an angle of thirty degrees around the axis AX.

Additive Manufacturing

The additive manufacturing on a bed of powder designates the adding of material layer by layer, on a build plate of a dedicated machine, to form a physical object from a digital model. In the case of a metal component, the laser melting/sintering method is used which consists in totally or partially melting a thin material powder layer using a laser at each pass.

Figure 5:
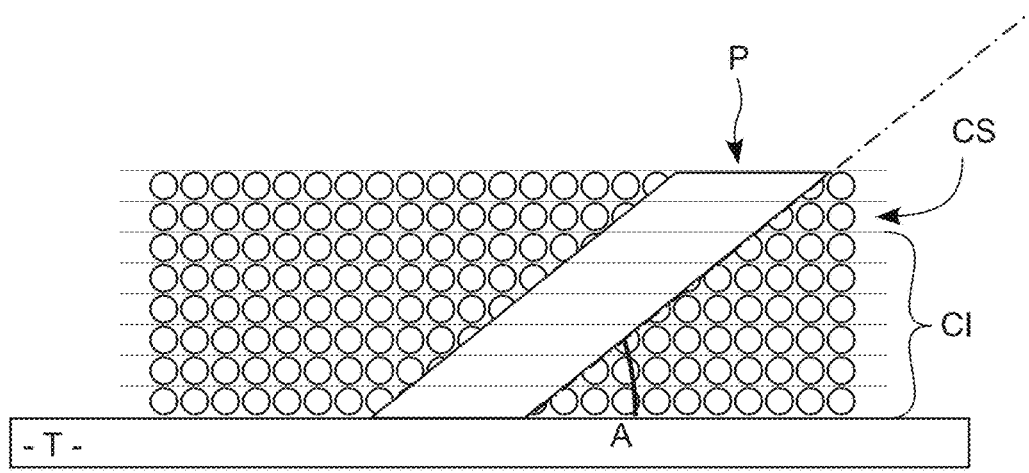
FIG. 5 diagrammatically shows a problem of collapsing during the additive manufacturing of a component.

The powder used for laser melting/sintering is not self-bearing. As can be seen in FIG. 5, during the manufacture of a component P, the powder that is not melted/sintered of the lower layers marked by CI, i.e. that is not swept by the laser, is not able to support the melted powder of a consecutive upper layer CS beyond a minimum clearance angle A between the component P and the build plate T.

To resolve this question, while manufacturing the component, supports are formed that support each region having a clearance angle less than the minimum angle A, in order to prevent a local collapse. The component and the supports are integral, manufactured at the same time and made of the same material.

Once the additive manufacturing is completed, the supports constitute non-functional material and must thus be removed, for example by machining. For this purpose, these supports are fully cellular elements, generally in the form of mesh or coming from the ordered structure stack called lattices, consuming less powder and being more easily removable than a block of uniform material.

During the manufacturing thereof, the bearing support 21 is oriented in such a way that its axis of revolution AX is normal to the build plate T, by starting with the formation of the first edge 25 of the cylindrical element 23. In the example of the figures, the minimum clearance angle A is defined at 40° with respect to the plate T, and certain regions of the bearing support 21 have a clearance angle less than this minimum angle A, and require being supported.

In the rest of the following description, the terms "lower and "upper" are to be considered with respect to the direction of manufacture of the bearing support from the manufacturing plate T. An element is said to be upper with respect to another if it is farther away from the disc plate T than the other, and an element is said to be lower with respect to another if it is not as far away from the plate T as the other.

Manufacture of the Bearing Support with Supports According to the Prior Art

Figure 6:
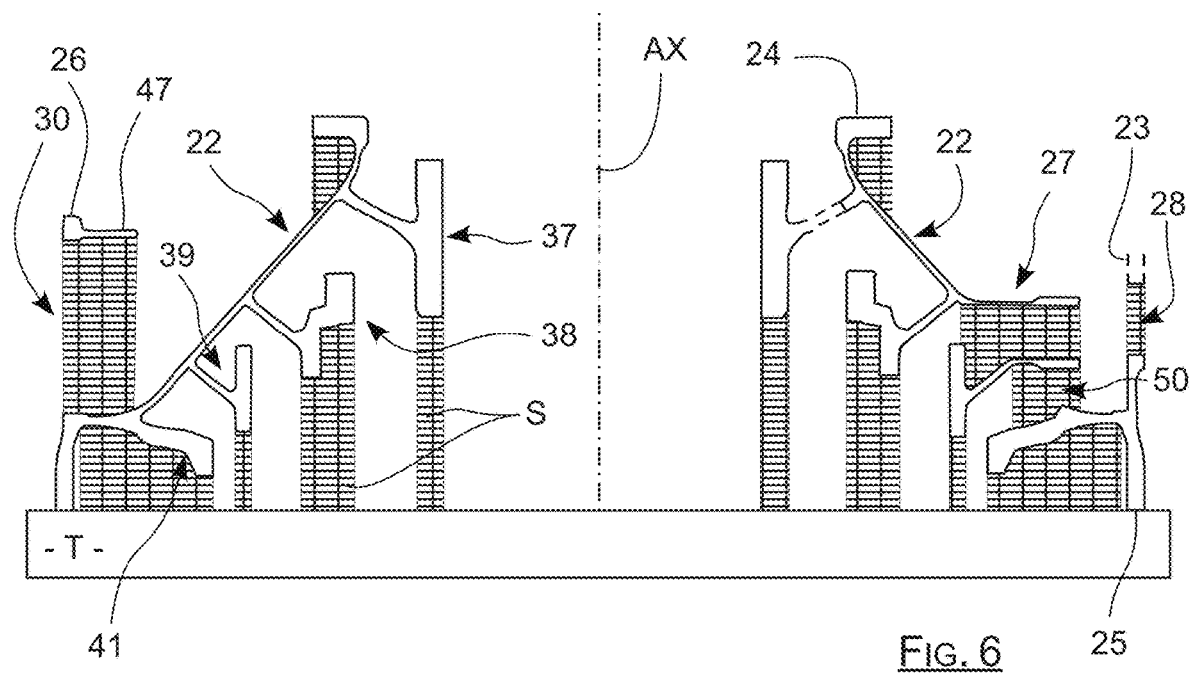
FIG. 6 is a cross-section view of a bearing support with supports formed according to the prior art.

The example of FIG. 6 shows supports S for the manufacture of the bearing support 21 which are fully cellular and arranged according to the prior art, and wherein each ring 37, 38, 39 and 41 requires a support erected from the plate T, since the faces from which the manufacture thereof begins are at a distance from the plate T and parallel to the latter, having in fact a clearance angle of 0°.

Supports S are also necessary for the formation of ducts 27, orifices 28 and windows 30. Moreover, the cone 22 comprises a through-hole 50 formed under ducts 27, which requires locally supporting the ring 39 with a support erected from the ring 41 located below.

Regarding the ring 24 and certain portions of stiffener 47 located at windows 30 that have a radial section having a shape corresponding to that of the letter Γ, they extend normally to the axis AX. This ring 24 and these portions of stiffener are thus parallel to the plate T, and require being supported by supports erected from the bearing support 21, in particular from the cone 22.

Figure 7:
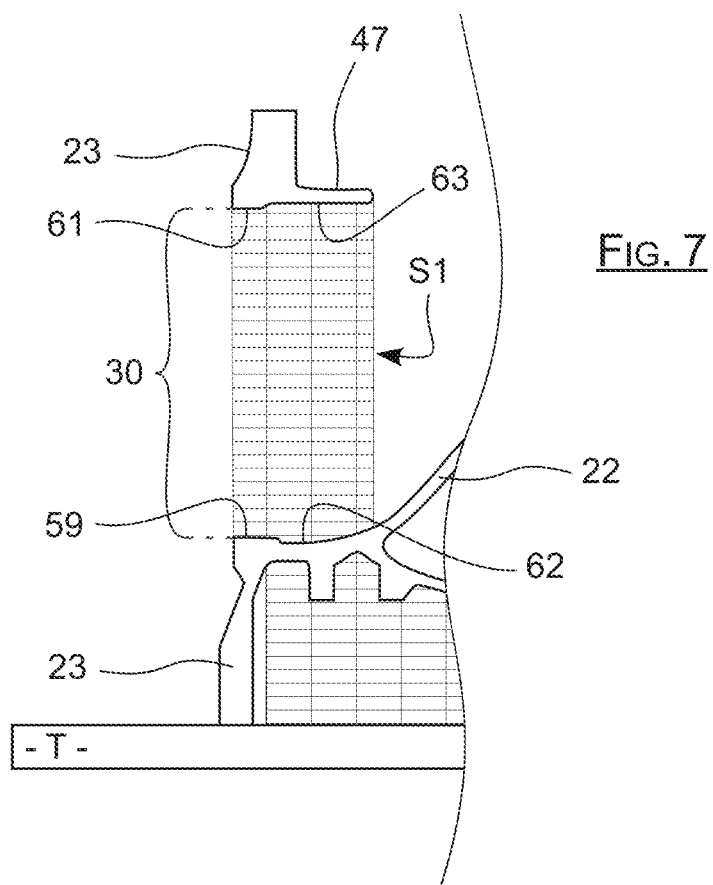
FIG. 7 is a diagram showing a support formed according to the prior art to manufacture a window and locally a stiffener that extends this window.

As can be seen in more detail in FIG. 7, the manufacture of the cylindrical element 23 above each window 30, and of portions of the stiffener 47 which are located in the radial extension of these windows, having a radial section of which the shape corresponds to that of the letter Γ, commonly requires a usual cellular support S1 which is voluminous and complex to remove.

Removing this support S1 is a long and delicate operation in light of the complexity of the shape of the bearing support 21. The extraction operation in particular requires performing a machining of the cylindrical element 23, more particularly at lower and upper window frames 59 and 61 that delimit the window 30, of an edification surface marked with 62 at the cone 22 and of a lower surface 63 of stiffener that is normal to the axis AX. Furthermore, passing the machining tool is particularly difficult, even impossible, at a zone in the presence of two juxtaposed ducts 27, as can be seen at the top left in FIG. 3.

The invention consists of proposing an alternative solution to the support S1 shown in FIG. 7 for the support of the upper window frames 61 and of the lower surfaces 63 of stiffener, through which respectively start the manufacture of the cylindrical element above windows 30 and of portions with a Γ-shaped section of the stiffener 47 which are located in the extension of these windows 30.

Figure 8:
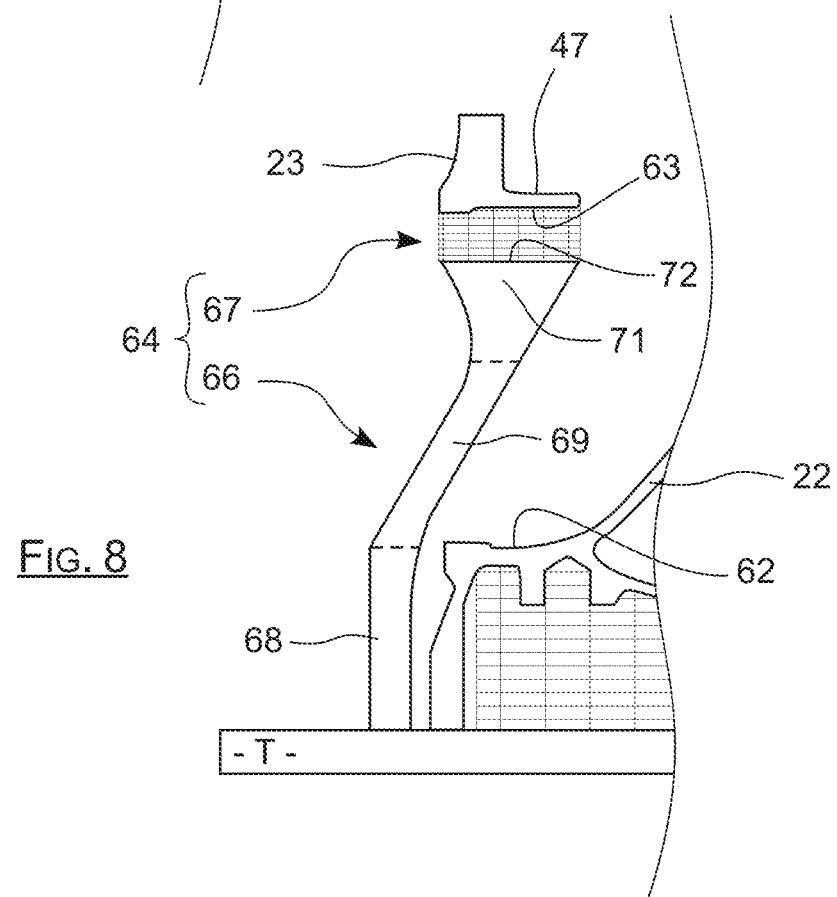
FIG. 8 is a cross-section view of a blank component comprising a support to manufacture a window and locally a stiffener in the extension of this window according to the invention.

Manufacture of the Bearing Support in Accordance with the Method According to the Invention The idea at the base of the invention is to advantageously use the windows 30 that constitute an access from the outside of the cylindrical element 23, by erecting supports 64 that each penetrate into a window to support both the upper window frame 61 and locally the stiffener 47 at the lower surface 63, as shown in FIG. 8.

The method according to the invention thus provides to obtain a blank component, in other words the bearing support 21 in a state at the laser melting/sintering machine output, including supports 64 that each extend outside a window 30. Each support 64 includes a pillar 66 in the form of a block of material and a cap 67 which is a cellular element connecting the pillar 66 to the upper window frame 61 and the lower stiffener surface 63.

Each pillar 66 has a semi-arched shape by comprising a foot 68 erected perpendicularly to the plate T, in other words parallel to the axis AX, and at a distance from the cylindrical element 23, an inclined segment 69 that extends the foot 68 to the associated window, and terminates with a head 71. The inclined segment 69 forms a ramp that forms with the plate T an angle of 40°, not requiring being supported during the manufacture thereof by a cellular element that would rest at least partially on the bearing support 21 in the opposite case. The head 71 extends from the inclined segment 69 by widening in order to form a support base 72 that corresponds to the projected surface of the upper window frame 61 and the lower stiffener surface 63 above it, along the axis AX. In the same way as the inclined segment 69, the head 71 forms with the plate T angles greater than 40°.

During the manufacture, the supports 64 are constructed at the same time as the support bearing 21. The cap 67 is erected from the support base 72 in order to ensure the support of the upper window frame 61 and of the lower stiffener surface 63, as in the opposite case, they would rest on non-melted/sintered powder. The cap 67 then connects the pillar 66 to the support pillar 21, knowing that the supper window frame 61 and the lower stiffener surface 63 start the manufacture thereof by a layer of powder deposited on the support base 72 that melts/agglutinates with it.

The detaching step of the supports 64 from the rest of the blank component, in other words the blank manufacturing at the outlet of the laser melting/sintering machine, first consists of clearing the foot 68 from the plate T on which it was manufactured by shearing called "hard" or by electro-erosion, commonly referred to as wire cutting. The operator then manually pulls the foot 68 like a lever, following an arched path noted as C, to pull off the cap 67 and free the pillar 66, the cap consequently breaking according of its lower mechanical resistance with respect to the pillar which is a block of material. Finally a light belting, in other words a re-working via abrasion, is carried out in order to remove any cap residues marked with 73 in FIG. 9 that remained attached at the upper window frame 61 and the lower stiffener surface 63, easily accessible by the tool.

The supports 64 according to the invention thus make it possible to manufacture the cylindrical element 23 above the window 30 and portions with an Γ-shape section of stiffener 47 in the extension of this window, while still limiting the cellular element volume and the surfaces to be re-worked. The machining times and costs associated with the extraction thereof are therefore reduced, the passage of the tool not being hindered by the complexity of the shape of the bearing support 21.

The invention is not limited to the embodiment described of the pillar 66, and allows for the use of varied shaped when it still constitutes an offset edification surface of the cap 67, in particular preventing that the latter be erected directly from the bearing support 21.

Concretely, the method according to the invention has application in the general field of additive manufacturing, by proposing to form an offset edification surface of the cellular cap in order to support one or more component portions. The location of the pillars 66 is not limited in that they are manufactured from the outside of a component comprising a recess through which they are engaged: a pillar 66 can be formed in an internal recessed space of the component in order to support one or more portions that extends into this recessed space.

In our case, the upper window frame 61 and the lower stiffener surface 63 extend parallel to the plate T. But the invention can also be applied to other orientations of the surface or surfaces to be supported when the size allows for the formation of a support 64. It is also possible to erect a pillar 66 that has a branched or serpentine structure that is adapted to the morphology of the component.

Preferably, the support 64 does not comprise a surface forming an angle less than the minimum clearance angle A, so that the manufacture thereof does not require any additional cellular element. Here, it is to be noted that the value of the minimum clearance angle A is not necessarily equal to 40°, as it depends on the powder used. In this respect, the invention could provide that the inclined segment 69 and the head 71 form angles with the plate T of a different value in order to respect a new value of angle A.

It can also be considered, to support one or more component portions, to erect a pillar 66 not on the plate T if this is impossible, but directly on this component. In other words, in comparison with a usual support S1 erected on a first zone of the component that is difficult to machine, the support 64 would here be used not to overcome certain re-working on the component, but would be formed by erecting the foot 68 from a second zone of the component that can be machined more easily. Additionally, the support 64 can comprise a cellular base that is formed directly on said component, at the second zone, and whereon the foot 68 is erected to facilitate the detaching.

What is claimed is:

1. A method for: obtaining, by additive manufacturing, a component including at least one surface that has to be supported during manufacture, including:
    a step of forming by additive manufacturing a one-piece blank component on a build plate comprising a support including:
        a pillar comprising a foot from which the manufacture of this pillar starts,
            wherein the foot is perpendicular to the plate,
            the pillar being a block of material, and
            wherein the pillar further comprises,
                an inclined segment defining an acute angle with the build plate,
                a head formed at a distal end of the inclined segment, wherein said head widens to form a support base corresponding along a longitudinal axis to the at least one surface to be supported, and
                a cap formed on the support base, said cap comprising a cellular element connecting the pillar to the surface to be supported;
    a step of detaching the support from the rest of the blank component comprising pulling on the foot in the manner of a lever by following an arc path.

2. The method according to claim 1, wherein the step of detaching the support includes:
    the removal of the pillar inducing a rupture at the cap, and
    a finishing step to suppress residues from the cap remained attached to the surface to be supported.

3. The method according to claim 1, wherein the foot is directly erected from the build plate from which the component starts the manufacture thereof.

4. The method according to claim 1, wherein the component is a bearing support comprising at least one surface supported during the additive manufacturing thereof.

5. The method according to claim 1, wherein the cap is formed on the head.

6. A method for producing a component on a build plate via additive manufacturing, said component defining an opening and at least one surface to be supported above said opening, the method comprising:
    forming a pillar on said build plate, said pillar comprising a foot from which the manufacture of this pillar starts, wherein the foot is perpendicular to the build plate, said pillar further comprising an inclined segment defining an acute angle with said build plate and extending into said opening;
    forming a head at a distal end of the inclined segment, wherein said head widens to form a support base corresponding along a longitudinal axis to the at least one surface to be supported, and
    forming a cap on said support base, said cap connecting the at least one surface to be supported to said pillar and comprising a mechanical resistance that is lower than a mechanical resistance of said pillar.

7. The method of claim 6, further comprising detaching the pillar from the component by pulling on the pillar.

8. The method according to claim 1, wherein the head forms with the build plate at an angle greater than 40°.

9. The method according to claim 6, wherein the head forms with the build plate at an angle greater than 40°.

\* \* \* \* \*